(No Model.)

S. SCHWARZSCHILD.
JACKETED OLEOMARGARINE CHURN.

No. 299,685. Patented June 3, 1884.

WITNESSES:
Chas. Nida
C. Sedgwick

INVENTOR:
S. Schwarzschild
BY Munn & Co
ATTORNEYS.

United States Patent Office.

SAMUEL SCHWARZSCHILD, OF NEW YORK, N. Y.

JACKETED OLEOMARGARINE-CHURN.

SPECIFICATION forming part of Letters Patent No. 299,685, dated June 3, 1884.

Application filed March 11, 1884. (No model.)

*To all whom it may concern:*

Be it known that I, SAMUEL SCHWARZSCHILD, of the city, county, and State of New York, have invented a new and useful Improvement in Jacketed Oleomargarine-Churns, of which the following is a full, clear, and exact description.

Reference is to be had to the accompanying drawings, forming a part of this specification, in which similar letters of reference indicate corresponding parts in both the figures.

Figure 1:
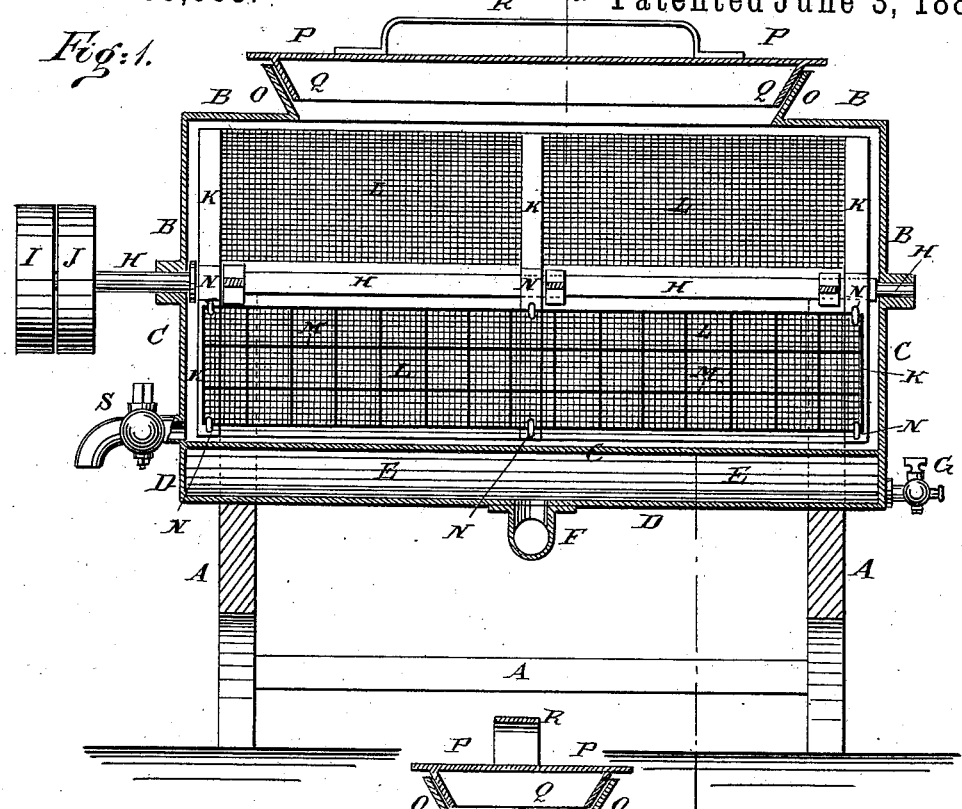
Figure 2:
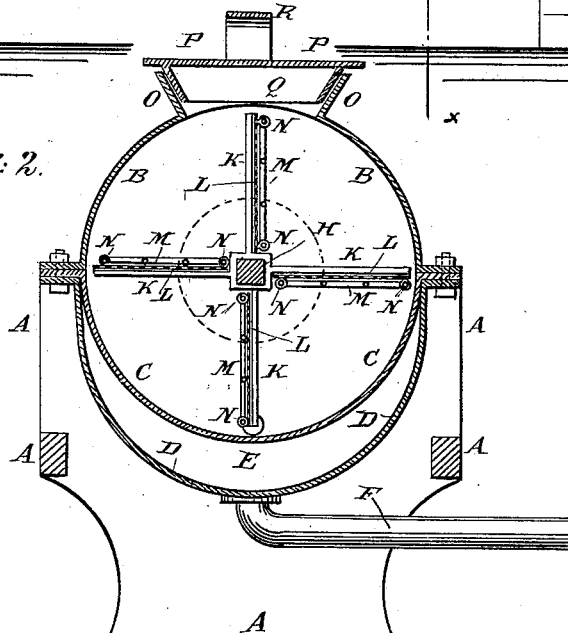

Figure 1 is a sectional side elevation of my improvement. Fig. 2 is a sectional end elevation of the same, taken through the broken line *x x*, Fig. 1.

The object of this invention is to facilitate and secure the thorough intermingling of the various ingredients used in the manufacture of oleomargarine and similar products, and allow the operations of melting and mixing to be done in the same vessel.

The invention consists in an oleomargarine-churn constructed with a jacket to receive steam or hot water to melt the oils, and revolving wire screens to finely divide and thoroughly mix the ingredients, as will be hereinafter fully described.

A represents the frame of the churn. The churn body or shell is made in two semi-cylindrical parts, B C, the edges of which are bent outward, to form flanges to receive the bolts that secure the said parts and the jacket D to each other. The jacket D is made in semi-cylindrical form, with its sides extended upward beyond the diameter passing through the center, and then bent outward to form flanges to receive the fastening-bolts, so that a space, E, will be formed between the said jacket D and the lower part, C, of the churn-body, to receive steam or hot water for melting the oils.

With the jacket D is connected the end of a pipe, F, for admitting the steam or hot water, and a faucet, G, for drawing off the water of condensation.

H is a shaft, which passes longitudinally through the body B C, and revolves in bearings in the ends of the said body. One of the ends of the shaft H projects, and to it are attached a loose pulley, I, and a fast pulley, J, to receive a driving-belt.

To the shaft H are attached four (more or less) rows of radial arms K, the outer ends of which extend nearly to the wall of the body B C.

To each row of arms K are attached a screen, L, of fine wire-cloth, and a screen, M, of larger wire and very large mesh. The two screens L M are secured to the arms K by staples N or other suitable means, and the coarse screen M is designed to support the fine screen L against the pressure of the substances through which the said screens are forced by the revolution of the shaft H.

In the upper part, B, of the churn-body is formed an opening for the admission of the substances to be operated upon, and which is surrounded by a flaring flange, O. The cover P has a tapered flange, Q, upon its lower side, to rest and fit upon the flaring flange O, so that the said cover P will close the opening in the churn-body tightly. The cover P is provided with a handle, R, for convenience in handling it.

The churn-body B C is provided with a faucet, S, for drawing off the contents of the said body.

With this construction the oils can be melted by steam or hot water admitted to the jacket D, and the said oils will be finely divided and thoroughly intermingled with each other and with the milk or cream by the revolution of the screens L M, which causes the said substances to pass through the fine meshes of the said screen L.

Having thus described my invention, I claim as new and desire to secure by Letters Patent—

1. An oleomargarine-churn constructed, substantially as herein shown and described, with a jacket to receive steam or hot water, and revolving screens to mix the ingredients, as set forth.

2. In an oleomargarine-churn, the combination, with the churn-body B C and the rotary shaft H, of the rows of radial arms K, the fine wire screens L, and the coarse wire screens M, substantially as herein shown and described, whereby the ingredients will be finely divided and thoroughly intermingled, as set forth.

SAMUEL SCHWARZSCHILD.

Witnesses:
 JAMES T. GRAHAM,
 EDGAR TATE.